UNITED STATES PATENT OFFICE.

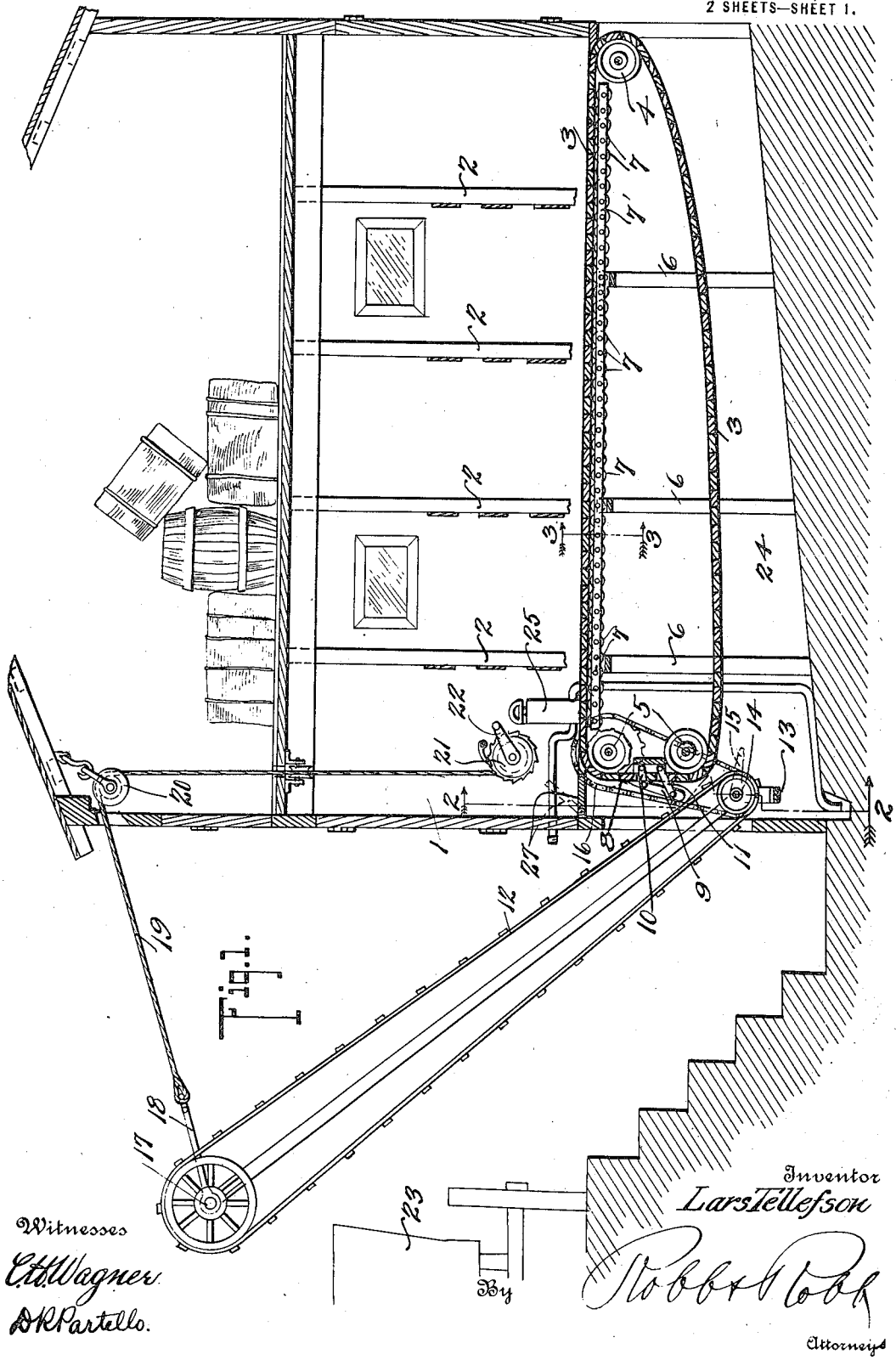

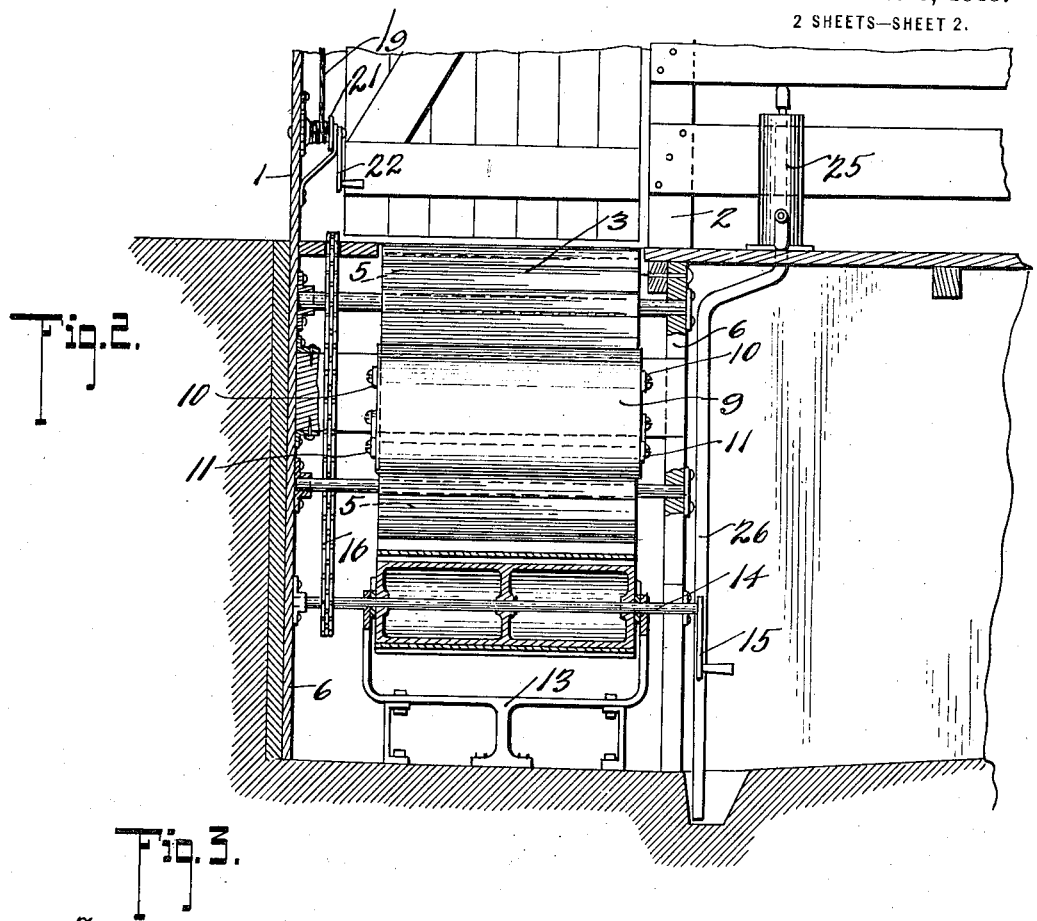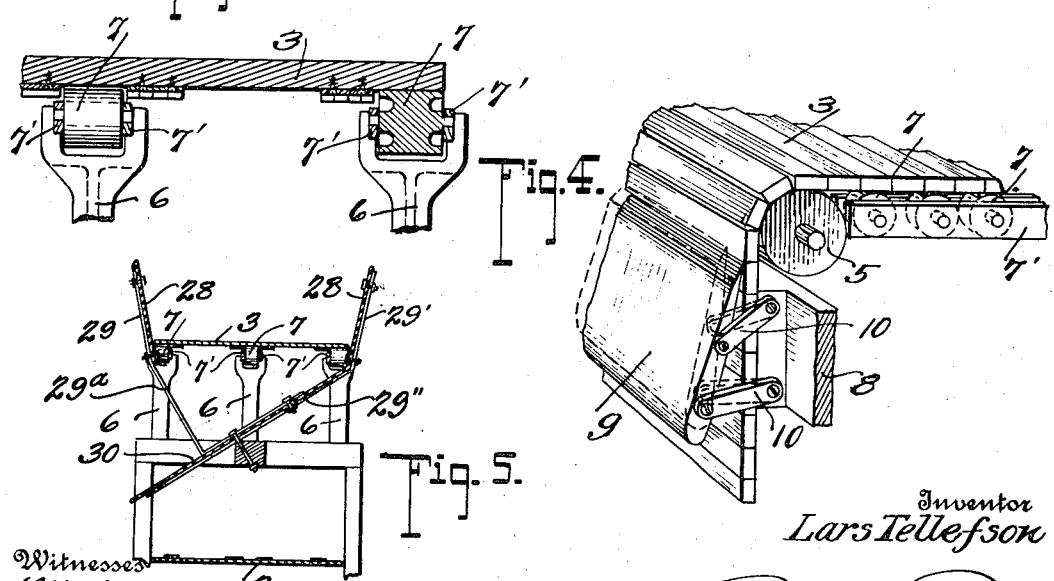

LARS TELLEFSON, OF RESTON, MANITOBA, CANADA.

CONVEYER MECHANISM.

1,159,129.  Specification of Letters Patent.  Patented Nov. 2, 1915.

Application filed December 7, 1914. Serial No. 875,916.

*To all whom it may concern:*

Be it known that I, LARS TELLEFSON, a citizen of Norway, residing at Reston, Manitoba, Canada, have invented certain new and useful Improvements in Conveyer Mechanism, of which the following is a specification.

The present invention relates to conveyer apparatus adapted particularly for use in removing manure from stables, the object in view being to provide a carrier for receiving the manure coöperating with a conveyer for conveying same to a point exterior of the building, and means for removing said manure from the carrier for deposit on said conveyer.

A still further object of my device is the arrangement of the removing means so that it will perform a dual function, of both scraping and directing the transfer of the material, in addition to the provision of proper coaction of the scraping element with the carrier in such a manner that the closer the adhesion of the manure to the carrier, the greater the contact of said scraper with the carrier will be produced by its very removing action.

These and such other objects as may hereinafter appear are attained by the novel construction, combination and arrangement of parts to be hereinafter specifically described and claimed.

Reference will now be had to the accompanying drawings forming a part of this specification, wherein:—

Figure 1 is a vertical sectional view through apparatus constructed in accordance with my invention applied in position in a stable, Fig. 2 is a fragmentary sectional view taken about on the line indicated 2—2 of Fig. 1, Fig. 3 is a fragmentary enlarged sectional view parts being shown broken away and in elevation, taken on the line 3—3 of Fig. 1, and Fig. 4 is a detail perspective view showing more clearly the scraping member for the carrier in its coöperative position with respect to the same. Fig. 5 is a transverse sectional view through the conveyer as provided with lateral guards.

Throughout the following detail description, and on the several figures of the drawings, similar parts are referred to by like reference characters.

In the drawings the numeral 1 designates a conventional form of stable provided generally with a plurality of stalls 2 extending from one side of the same to the other. Arranged in rear of the stalls and in such a manner as to constitute a portion of the floor is an endless carrier 3 which passes around the guide roller 4 at one side of the stable and around the spaced guide rollers 5 at the opposite side of the stable. In order to adequately support the upper horizontal portion of the carrier 3 I provide a plurality of standards 6 which carry anti-friction rollers 7 removably mounted in spaced supporting bars 7′ upon which this portion of the carrier rests and operates in the use of my apparatus. It will be noted by reference to Fig. 1 that the spaced guide members 5 act to cause the carrier to present a vertical portion at one side of the stable and adjacent to this vertical portion is located a support 8 disposed in rear or at one side of said carrier. At the opposite side of said carrier is provided the scraper 9 which is connected to the support 8 by means of a pair of upper relatively short bars 10 having pivotal connection with these parts, and the lower pair of bars 11 similarly connected to the scraper and support respectively. This peculiar arrangement of the supporting means enables a special coaction of the scraper with the carrier in a manner which will now be set forth. The scraper, it will be noted, is disposed at an incline and by reason of the differences in the lengths of the lateral bars it is obvious that the upper scraping edge will swing on a smaller arc than the opposite or lower edge thereof, said swinging action therefore causing the scraper edge to contact with relatively increased pressure against the carrier proportionate to the pressure against the scraping edge of said scraper in a longitudinal direction of this member, such as imparted thereto by manure or like material which is disposed on said carrier. The purpose of this arrangement, it will be obvious, serves an advantageous action, in that the closer the manure adheres to the carrier the greater the scraping action of the scraper when the carrier is operated for removing said manure therefrom in the manner hereinafter more fully described.

At one side of the stable and having its lower end portion disposed beneath the vertical portion of the carrier, is located an elevating conveyer 12, said lower end being suitably supported by the standard 13 most clearly shown in Fig. 2 of the drawings. The axis 14 about which the conveyer 12 operates at its lower end portion is provided with a crank or operating handle 15 to enable the manual rotation of said conveyer and a sprocket chain 16 operatively connects the said axis with the axis of the upper guide roller 5 of the carrier 3, enabling the simultaneous actuation of the latter in an apparent manner.

The upper axis 17 of the conveyer 12 is provided with a pivoted yoke 18 to which is connected the cable or similar member 19 passing over the block 20 and downwardly to the winding drum 21. By means of the crank 22 of said drum, the upper end of the conveyer may be raised or lowered as desired to properly dispose this end with respect to a vehicle indicated at 23 into which the manure is deposited for removal. The liquid ingredients of the manure pass through the interstices of the carrier 3 into the compartment 24 beneath the floor of the stable, this compartment having an inclined floor as shown in Fig. 1 so that the liquid will collect at one side of said stable. A pump 25 is preferably provided and has a conduit 26 leading into the compartment 24 for the purpose of removing the liquid therefrom. A trap door 27 is formed in the floor at one end of the carrier 3 to enable access to the compartment 24 and when in lowered position said door forms a continuation of the carrier.

In the use of the apparatus it will be apparent from the drawings that manure collected upon the carrier arranged in rear of the stalls of the stable may easily be removed from the building by operation of the crank 15 which acts to pass the carrier around its support and guiding rolls where the material is scraped therefrom in the manner hereinbefore described by the scraper 9, said scraper not only removing the manure but acting to direct the same onto the conveyer 12 which carries the material upwardly for deposit into the vehicle 23. The advantages of such an apparatus will be apparent to those skilled in the art to which this invention refers since the removal of manure from the stable is greatly facilitated thereby. Where the carrier does not form essentially a part of the floor of the building, I preferably provide guard means at each side thereof to prevent the manure from becoming displaced in its travel on the conveyer, as well as eliminating likelihood of said material dropping upon the under surface of the lower portion of the carrier, in a manner best shown in Fig. 5. At each side of the carrier are longitudinally arranged guard boards 28 secured by means of braces 29, 29' extending substantially vertically above the carrier, a guard board 30 extending diagonally in a downward direction from one of the boards 30 and between the two traveling portions of the carrier. The board 30 is held by an extension 29'' of the braces 29' and extensions 29ª of the braces 29. Thus the carrier is unlikely to become clogged by material falling from the upper portion of the carrier onto the lower.

Having thus described the invention, what I claim as new is:—

1. In apparatus for removing manure from stables, the combination of an endless carrier constituting a movable floor to receive the manure, guide means about which the carrier operates to present a vertical portion, a scraper arranged at the vertical portion to remove the manure therefrom in passing around the guide means, supporting links for holding the scraper at an incline, said links causing actuation of the scraper increasing scraping action upon pressure against said scraper, and an elevating conveyer having a portion extending beneath the scraper whereby said manure is directed on the conveyer.

2. In conveyer mechanism of the class described, an endless carrier, means for operating the same, a scraper, pivot means for supporting the scraper at one end and adapted to move the scraper toward the carrier upon pressure thereagainst, other pivot means connected to the scraper at its opposite end and adapted to move said scraper in the opposite direction to that above mentioned upon pressure against said scraper, whereby to cause closer contact of one end with the carrier in proportion to the adhesion of the material to the latter.

3. In conveyer mechanism of the class described, an endless carrier, means for operating the same, a scraper, and means movably supporting the scraper comprising spaced bars pivotally connected to each side of the scraper, said bars being of different lengths whereby to cause a differential movement of the ends of the scraper upon application of pressure longitudinally of said scraper.

4. In conveyer mechanism of the class described, an endless carrier, means for operating the same, a scraper at one side of the carrier, a stationary support for said scraper arranged at the other side of the carrier, a pair of relatively short connecting bars pivotally connected to the scraping edge of the scraper and to the support aforesaid and a pair of relatively long bars similarly connected to the opposite edge and the support, whereby pressure on the scraping edge will cause a swinging inwardly of said edge in a greater proportion to that of its opposite edge.

In testimony whereof I affix my signature in presence of two witnesses.

LARS TELLEFSON.

Witnesses:
LLOYD ARMSTRONG,
BIJOU CALDWELL.